Oct. 4, 1932.    M. S. CURTIS    1,880,843
METAL WORKING MACHINE
Filed Sept. 10, 1926    4 Sheets-Sheet 1
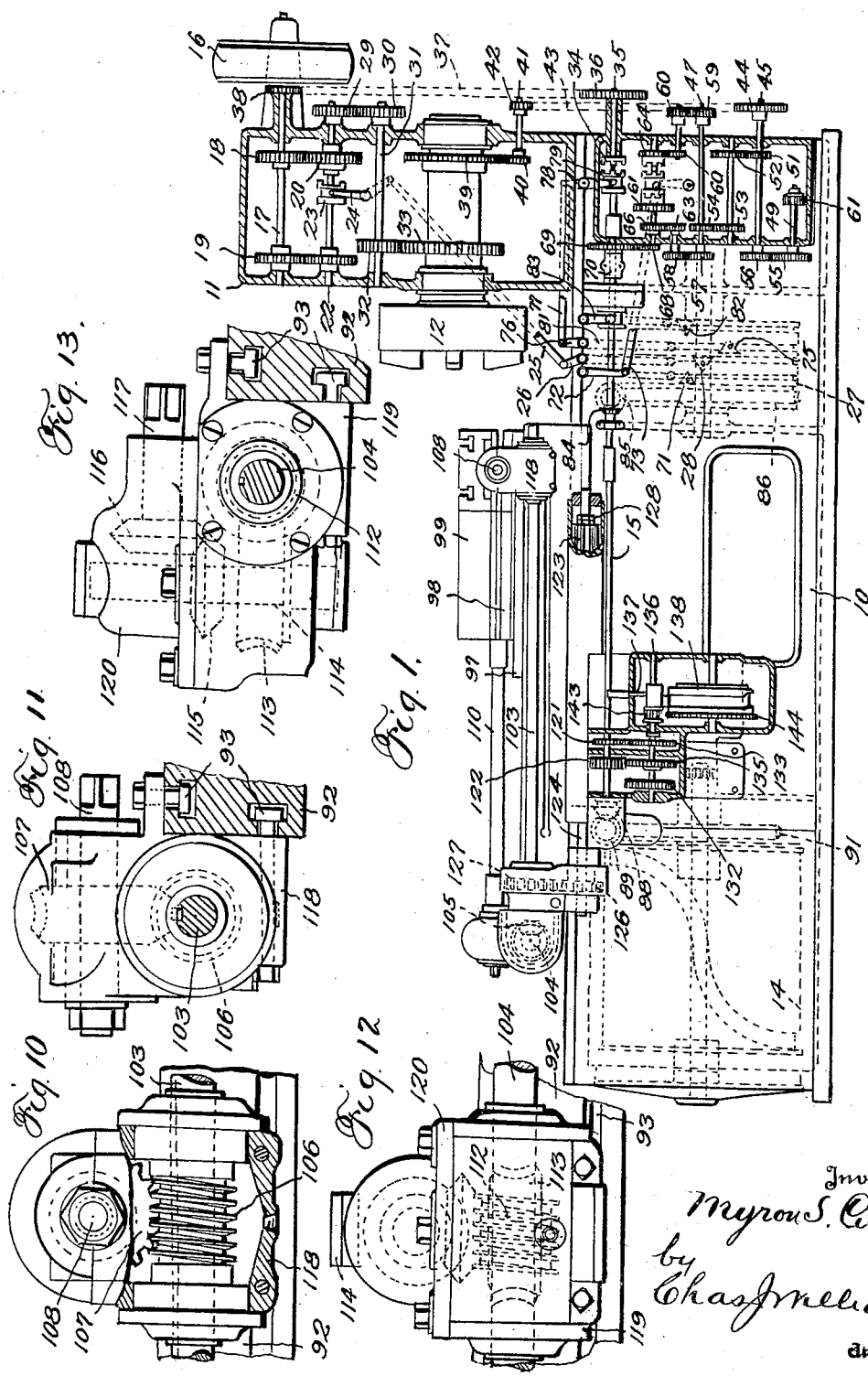

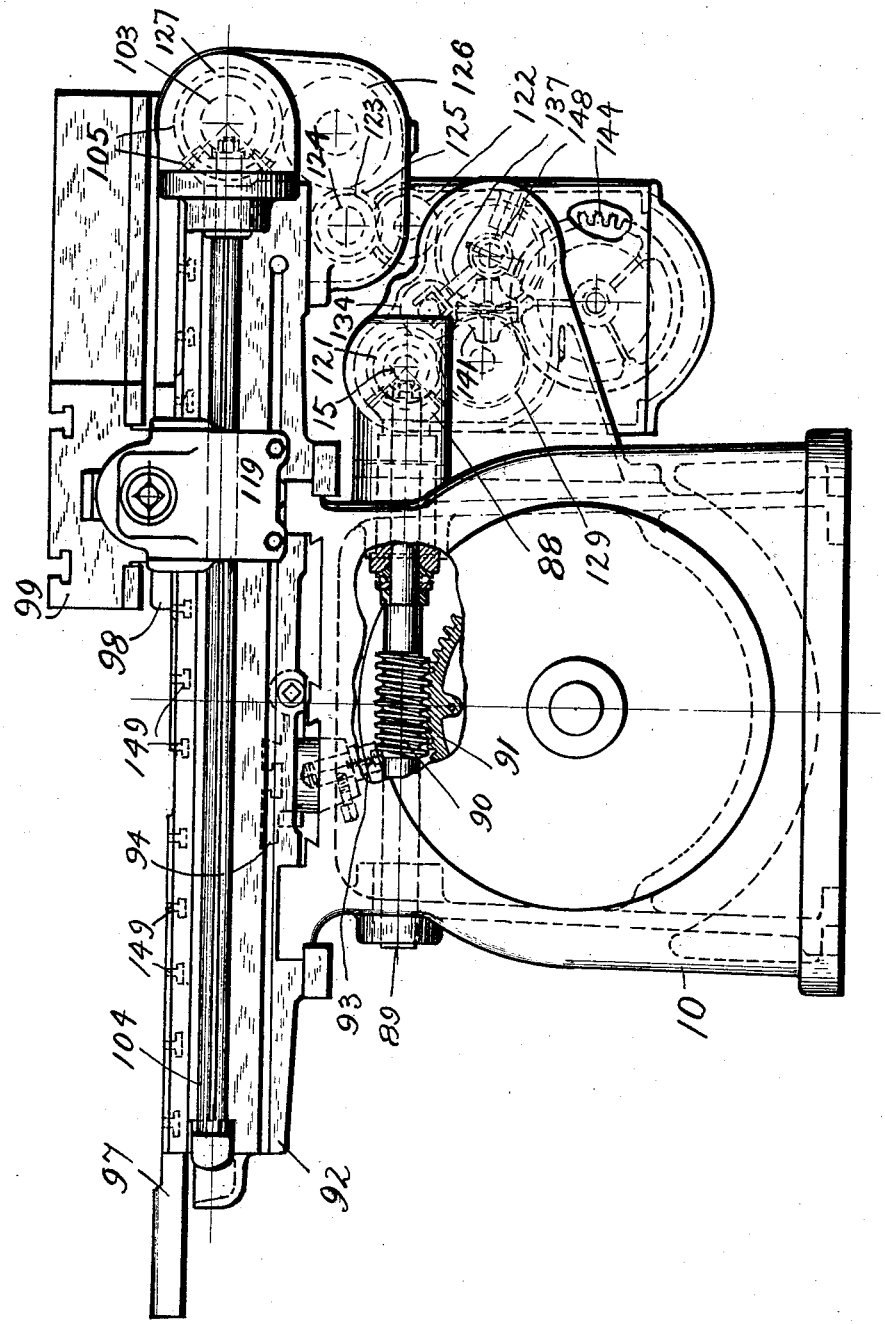

Oct. 4, 1932.  M. S. CURTIS  1,880,843
METAL WORKING MACHINE
Filed Sept. 10, 1926    4 Sheets-Sheet 3
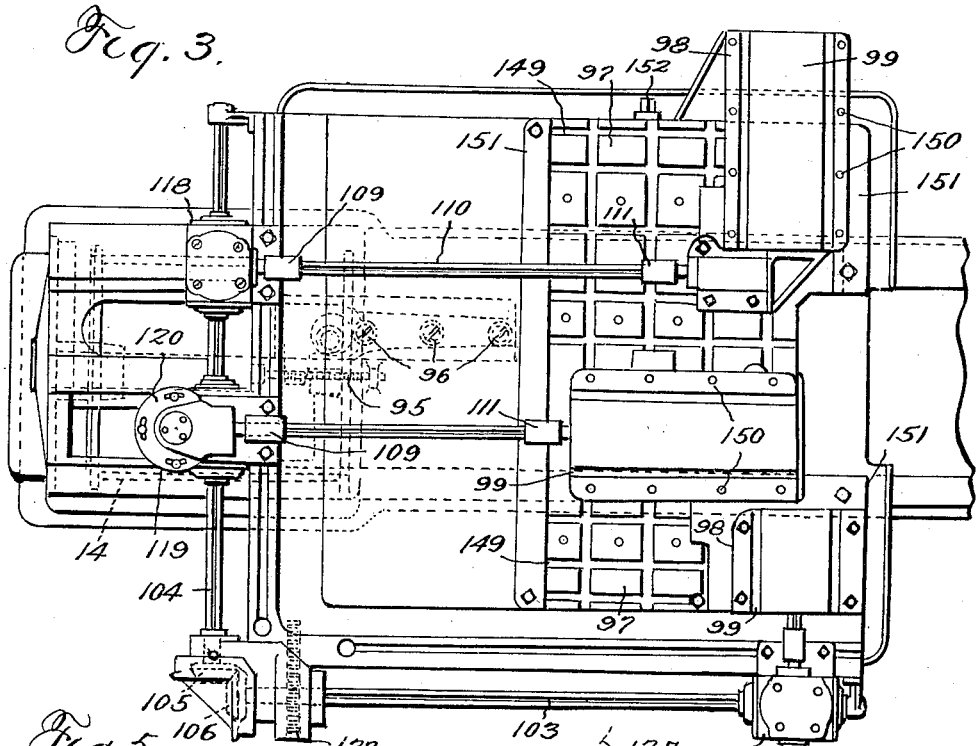
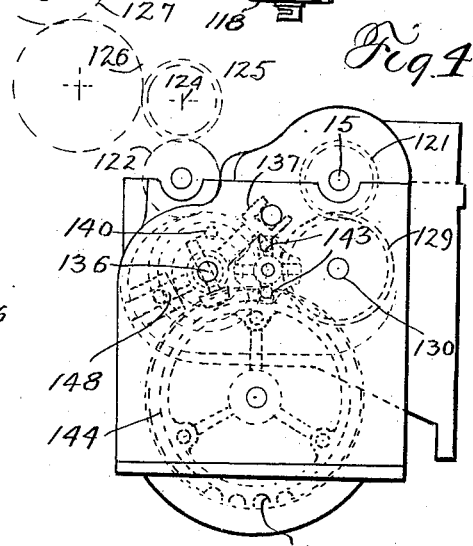

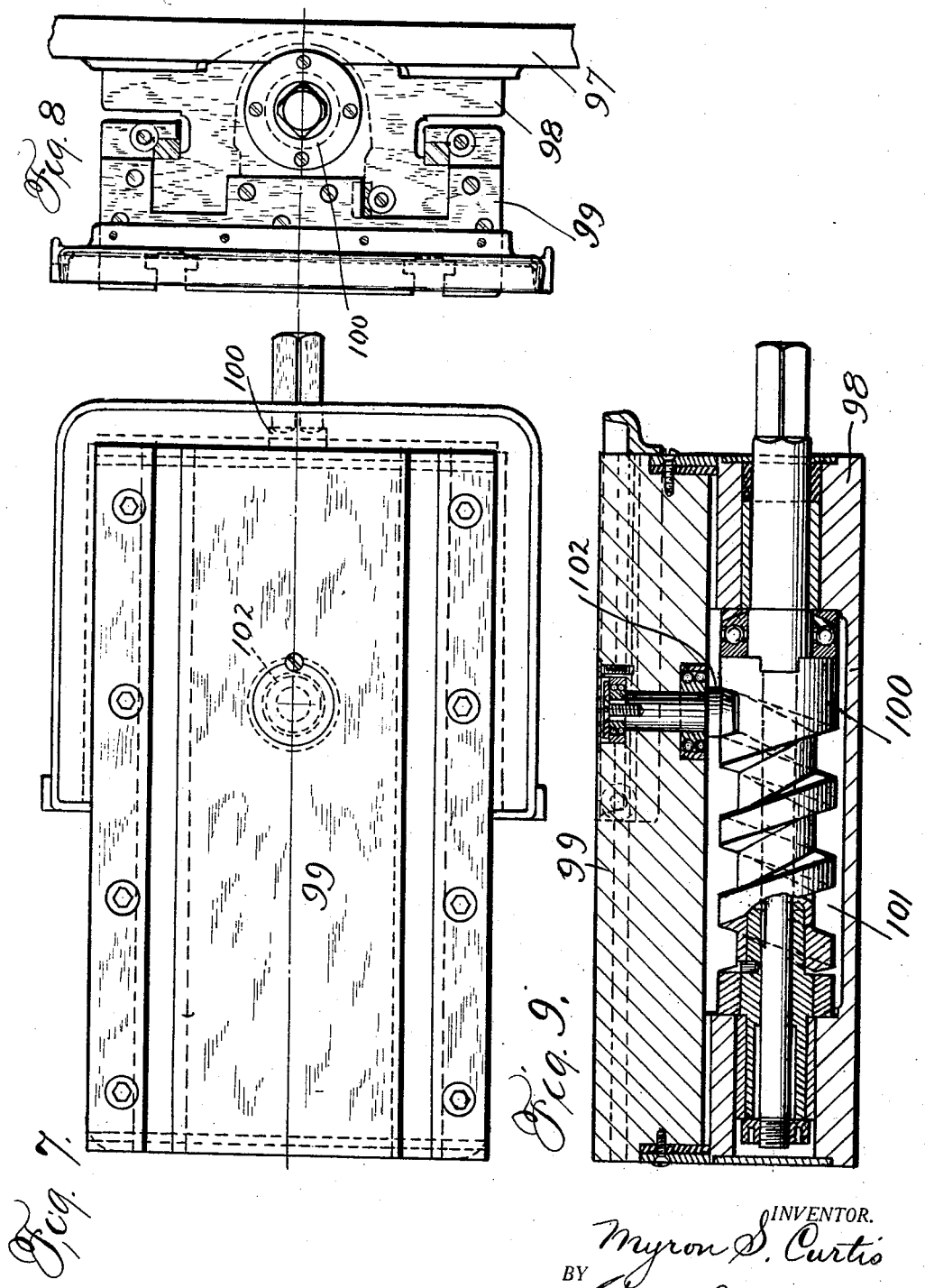

Patented Oct. 4, 1932

1,880,843

UNITED STATES PATENT OFFICE

MYRON S. CURTIS, OF PAWTUCKET, RHODE ISLAND, ASSIGNOR TO POTTER & JOHNSTON MACHINE COMPANY, A CORPORATION OF RHODE ISLAND

METAL WORKING MACHINE

Application filed September 10, 1926. Serial No. 134,718.

My invention relates to metal working machines, and in the embodiment which is selected as one illustration thereof is a turning lathe having a rotatable work-holder or chuck and a plurality of tool-holders each having its own feed mechanism, and each capable of being placed in that particular position with reference to the chuck that the requirements of the work to be done by the tools necessitate. An important object of the invention is to greatly facilitate the work of changing the positions of the tool-holders from time to time, as the requirements of the various successive, and different jobs call for, compared with what has heretofore been proposed, the latter, in brief, requiring that for every different position of the tool holders new bolt holes shall be drilled in the toolholder carrying bed or table,—a job obviously troublesome to perform with the bed or table in place, and objectionable because successively bored holes may intersect. Other objects and advantages flowing from the invention will hereafter be mentioned, or will be appreciated by those skilled in the art. My invention consists in whatever is defined by or is included within the scope of the appended claims.

Some of the advantages I claim over existing machines of this type are as follows:

On other machines the movement of the platen to and fro is by a screw having but one ratio of speed. It is therefore impossible to utilize the movement of the platen for cutting, and it is also necessary to finish the movement of the platen before the slides start cutting. Therefore for a job where the slide feed is at right angles to the spindle, and when the tool must begin in the middle of the work, it is necessary to provide complicated subslides to feed the tool into the work.

With my design, as the platen is controlled by a cam drum, which can be provided with any shape cams, and can be rotated at any desired speed and automatically controlled by the dog wheel, I am able to utilize any portion of the platen stroke for feeding. Also as the rotation of the slide cams is controlled by the timing cam in the timing box and thus is easily controllable, I am able to make any number of novel and useful combinations of platen feed and slide feed.

The present machines of this type have the slides fastened directly to the platen. If it is desired to change the location of the slides for a new job, or change in design, it is necessary to relocate and drill them to the platen. This usually must be done by hand as the platen is too heavy to be conveniently removed and placed under a drill press. Also if one platen is used for several jobs, or if change in design necessitates change in slide location, it is apparent that soon the platen will be so full of holes that it will be necessary to plug the old ones before new ones can be drilled.

I overcome these difficulties by providing a base to which the slides are fastened and which is doweled to the platen in such a manner that it can be easily removed, and replaced in exactly its former position. As it is a simple and cheap piece, a new one can be furnished for each set up, and slides can be easily located and fastened in place in the tool room, or any other convenient place remote from the machine. Furnishing a separate base for each set up also does away with any trouble of holes running into each other, and facilitates changing over from one job to another.

With existing construction when the slides are placed at an angle, it is necessary to use shafts with universal joints, a construction which is inherently weak and subject to wear.

By providing an adjustable slide driving bracket, and by extending the shaft which drives the bracket on any number of sides of the platen, I am able to use a straight line drive no matter where or at what angle the slides are located.

By using automatic changes of speeds and feeds, and a constant speed for idle movements, I am able to use the feeds and speeds which can be best used at any particular time in the operation.

As I operate the platen and slides by cams which have at the end a land parallel to the direction of rotation of the cam drum, I am able to bring both the platen and slides to a positive position each time, and maintain this position indefinitely.

In the drawings:

Fig. 1 is a rear elevation, partly in section;

Fig. 2 is an end elevation, looking toward the headstock, partly in section;

Fig. 3 is a plan view of the platen end of the machine;

Fig. 4 is an enlarged end elevation of the timing box;

Fig. 5 is a spread-out longitudinal section of this timing box;

Fig. 6 is a development of the timing cam;

Fig. 7 is a plan view of one of the slides and base;

Fig. 8 is an end view of one of the slides and base;

Fig. 9 is a longitudinal section of slides and base;

Fig. 10 is a rear elevation, partly in section, of a plain slide driving bracket;

Fig. 11 is an end elevation of Fig. 10;

Fig. 12 is a rear elevation of an adjustable slide driving bracket;

Fig. 13 is an end elevation of Fig. 12.

Referring to what appears in the drawings, a lathe of usual construction is shown in that it comprises a bed, 10, a headstock, 11, in which is mounted a spindle that carries a chuck, 12, and a tool-supporting platen or carriage, 13, which is movable in a straight line towards and from the chuck to bring the tools to and remove the same from working or cutting position, such movements of the carriage being effected by the well-known cam drum, 14. It may be added that there is a feed shaft, 15, geared to the drum, 14, for transmitting the feed motions to the cutting tools, which has a driving connection with the workspindle so that speed changes of the spindle will be accompanied by changes of speed of the feed shaft, and there is also a driving connection between the feed shaft and a constant speed driving pulley. The spindle as before stated is driven at varied speeds (which may be changed either automatically or by hand) from the constant speed driving pulley, 16. This pulley is keyed to shaft, 17, on which are fastened pinions, 18, and 19, meshing, respectively, with clutch gear, 20, which runs loose on shaft, 22, and ratchet gear, 21, which is keyed to shaft, 22. The construction of ratchet gear, 21, is such that when clutch, 23, which is keyed to shaft, 22, is in mesh with gear, 20, shaft, 22, runs away from gear, 21, and shaft, 22, is driven through pinion, 18, and gear, 20. When clutch, 23, is out of mesh with gear, 20, ratchet gear, 21, drives shaft, 22.

Clutch, 23, is operated automatically by dog, 28, on dog drums, 27, through lever, 26, rod, 25, and lever, 24. Thus more than one speed may be automatically given to shaft, 22. Keyed to shaft, 22, is change gear, 29, meshing with change gear, 30, on shaft, 31, thus giving additional hand changes of speed to shaft, 31. Keyed to shaft, 31, is pinion, 32, meshing with gear, 33, on spindle, 14.

Constant speed pulley, 16, also drives clutch, 34, at a constant speed through shaft, 35, sprocket, 36, chain, 37, and sprocket, 38.

Spindle, 14, has keyed to it gear, 39, which drives pinion, 40, keyed to shaft, 41, on which is a sprocket, 42, driving sprocket, 44, by means of chain, 43. Gear, 44, is keyed to shaft, 45, and by means of shafts, 46, 47, 48, 49 and 50, gears, 51, 52, 53, and 54, hand change gears, 55, 56, 57, 58, 59, and 60, pinions, 61, 62, 63, clutch gears, 64, and 65, and ratchet gear, 66, transmits hand and automatically variable speed to shaft, 67, and thus through pinion, 68, to ratchet gear, 69, on shaft, 70. The automatic changes are made by dogs, 71, through lever, 72, rod, 73 and yoke, 74, in the same way as already explained regarding the spindle speeds.

By means of dog, 75, lever, 76, rod, 77, yoke, 78, clutch, 79, slidably keyed to shaft, 70, can be automatically engaged with clutch, 34, when shaft, 70, is driven at a high constant speed by pulley, 16, for non-cutting movements, shaft, 70, running away from ratchet gear, 69, or can be disengaged, in which case ratchet gear, 69, picks up shaft, 70, and drives it in direct ratio to the spindle speed, with automatic and hand changes. Motion is transmitted from shaft, 70, to feed shaft, 15, through clutch, 81, operated automatically by dog, 82, and yoke lever, 83.

All previously mentioned clutch shifts which are automatically made, also can be made by hand by means of levers (not shown) on the yoke shafts.

Dog drum, 27, has motion imparted to it by feed shaft, 15, through mitre gears, 84, worm, 85, and worm gear, 86.

Shaft, 15, drives cam drum, 87, through mitres, 88, worm shafts, 89, worm, 90, and worm gear 91. It is thus seen that cam drum, 87, and dog drum, 27, are geared together with a constant ratio, which in this case is one to one although I do not limit myself to this ratio.

Slidably located on base, is platen or carriage, 13, which derives its motion from cam drum, 87, through cam roll, 93, and cam roll slide, 94. Cam roll slide, 94, is slidably located in carriage, 13, and adjustable by screw, 95, and clamped in position by bolts, 96. This adjustable slide enables the stroke of platen, 13, to be adjusted relative to the chuck.

Removably secured to the top of the carriage, 13, by bolts and dowels is a bed, 97, in the form of a thin plate, upon which is mounted and secured at the desired place and angle according to the work to be done one or more tool-holders, the tool-holders being applied to the bed plate, 97, before the latter is placed on the slide. Thus enables the work of locating and bolting the tool-holders in the required position, to be most conveniently done apart from the lathe, and at some convenient place in the shop. Said bed plate being light, can be easily handled and transported, and a new or fresh plate can be provided when the bolt holes bored therein become too numerous. Under some circumstances instead of removing the tool-holders from a plate and re-applying them in a different position, a number of plates may be provided, each having its own complement of tool-holders, and one plate with its particular tool-holders being substituted for another, as required by the job to be done. It will thus be seen that no work whatever needs be done on the platen or carriage, 13, when it is necessary to change the place and angles of the tool-holders.

To accurately fix the table on the slide a tongue, and groove connection may be provided.

From the feed shaft power is taken to traverse each of the tool slides, and each slide has its own independent connection with the feed shaft, or with an intermediate shaft, so that there is no gear connection from one tool slide to another, and the gear connection with each tool slide is a rigid one in that it includes a shaft that extends between toothed or worm gearing. The advantage of such a connection over a cord and pulley or a sprocket chain carried, as a common connecting drive over sprocket wheels for the several tool slides, will be obvious. The details of the drive connections from the feed shaft to the tool slides will now be described.

Each tool slide base, 98, has journaled in it longitudinally, the cam, 100, which has cut on it a helix, 101. This helix may be of any desired angle or angles, and has at each end a land or a portion parallel to the direction of rotation, so that the slide, 99, comes to exactly the same position at each end of the stroke. Journaled in the slide, 99, is a roll, 102, which meshes with helix, 101, and thus transmits motion from the cam, 100, to the slide, 99.

The cam, 100, receives an equal number of turns in both directions, one direction for feeding, and the reverse direction for return, the number of turns being governed by the timing box and the gearing in the slide driving bracket, as hereinafter explained. The cam receives its motion from either shaft, 103, or shaft, 104, which being geared together by mitres, 105, act as one shaft, through plain slide drive bracket Figs. 10 and 11 when the slide base, 98, is located at right angles to shaft, 103, or 104, or through adjustable slide driving bracket Figs. 10 and 11, when slide base, 98, is at an angle with shaft, 103 or 104.

The drive through the plain slide drive bracket is from shaft, 103, to worm, 106, through worm gear, 107, shaft, 108, coupling, 109, connecting shaft, 110, and coupling, 111, to cam, 100.

The drive through the adjustable slide drive bracket is from shaft, 104, worm, 112, worm gear, 113, shaft, 114, bevel gears, 115, and, 116, to shaft, 117, and thence to cam, 100, as before described.

Slide brackets, 118 and 119, are adjustable lengthwise on platen, 92, by T slots, 93. Cap, 120, on adjustable slide driving bracket, 119, is adjustable at an angle with bracket, 119, around shaft, 114.

Shaft, 103, receives its motion from feed shaft, 80, through gear, 121, keyed to shaft, 15, which drives, through the timing box afterwards explained, intermediate gear, 122, meshing with long pinion, 123, which is loose in shaft, 124, for the purpose of adjustment, but which drives shaft, 125, through clutch, 128. Keyed to shaft, 124, is gear, 125, meshing with idler, 126, which in turn meshes with gear, 127, keyed to shaft, 103.

This machine runs on the cycle principle, that is to say all operations are completed within one cycle of the dog drum, 27, which controls the automatic shifts. Therefore all operations must take place in a certain number of turns of the feed shaft, 15, and must be exactly synchronized with it. The platen drum, 87, is perfectly synchronized with the feed shaft, 15, as it is driven directly from the same by fixed gearing as already explained. It is the purpose of the timing box to synchronize the movements of the shaft, 103, which must go forward, backward, and stop, with the feed shaft, 15.

For the purpose of illustration we will assume that sixty revolutions of feed shaft, 15, make one cycle, and that the ratio of all trains of gearing between shafts, 15, and, 103, are 1 to 1. Gear, 121, on shaft, 15, drives gear, 129, keyed to shaft, 130, to which is also keyed gear, 131. Gear, 131, meshes with and drives clutch gear, 132, and gear, 129, drives clutch gear, 133, through intermediate, 134. Therefore clutch gears, 132, and 133, revolve in opposite directions, and shaft, 103, is driven ahead, reverse, or stopped as slidable clutch gear, 135, is in mesh with 132, 133, or in neutral, as gear, 135, drives shaft, 130, through gears, 122, 123, shaft, 124, gears, 125, 126, and 127, as already noted. Gear, 135, is free to rotate but is fixed endwise on shaft, 136, which shaft is free to move endwise but is held from rotating by yoke, 137, pinned to the shaft. The endwise movement of shaft, 136, is controlled by timing cam, 138, by cam roll, 139. Cam, 138, receives intermittent rotation from gear, 133, in the following manner:— Pin, 140, on gear, 133, engages geneva, 141, in which are four slots. Geneva, 141, therefore revolves once for each four revolutions of gear, 133. Geneva shaft, 142, has on one end two pins, 143, 90° apart, which mesh with teeth on gear, 144, keyed to spider, 145, to which is keyed cam, 138. As gear, 144, has thirty teeth, and revolves two teeth for each revolution of shaft, 142, it revolves once for every fifteen revolutions of shaft, 142, or once for every sixty revolutions of gear, 130. Thus it revolves once for every cycle of the machine.

Cam, 138, has three lands on it as shown, corresponding to the three positions of sliding clutch gear, 135, and has various rises to shift from one land to another. These rises are so spaced as to take place when gear, 144, indexes one tooth, and as the motion of geneva, 141, and gear, 144, are intermittent, they take place in a very small angle of rotation of gear, 133. As shown, these rises and dwells on cam, 138, are so spaced as to give clutch gear, 135, and thus shaft, 103, fourteen revolutions ahead, two revolutions dwell, fourteen revolutions reverse and thirty revolutions dwell, but can be changed to suit conditions, although the number of revolutions ahead must be always the same as the number of reverse because of cams, 100.

Slidable clutch gear, 135, has a flange, 146, with a slot, 147, which coincides with pin, 148, when the gear is in neutral position thus ensuring that gear, 135, comes to exactly the same position in neutral, and locking it there. Gear, 135, has on each side but one space for the single clutch tooth on clutch gears, 132, and 133. As the shifting of gear, 135, is done directly by gear, 133, and in a small angle of rotation of the same, it follows that gear, 135, always meshes with either gear 132, and 133, in exactly the same relative positions and always returns to exactly the same relative positions and always returns to exactly the same place at neutral, where it is locked by pin, 148. In machines which require no reversal of revolution but merely clutching and unclutching there will be no train of gears for reversal.

Instead of drilling holes in the removable table for attachment of the slide bases at the desired place and position, the table may be provided with T-slots, 149, either running all in one direction, or in various and intersecting lines, and the slide base provided with headed bolts, 150, to clamp the bases at the desired places. To allow for placing the slide bases at distances from the chuck which the crosswise spacing of the T-slots would not permit, the table could be made adjustable on the carriage or platen, either laterally, as shown or towards and from the chuck, or, indeed, the platen itself be made adjustable, this latter being readily done by making the cam-drum-engaging roll, 93, adjustable in its connection with the platen. For the cross adjustment shown, the bed plate, 97, is guided between parallel straps, 151, and a screw and nut device, 152, provide for adjustment. If desired the T-grooves could be differently located in interchangeable tables or they could be placed in the platen itself, and no removable table employed. In connection with the employment of T-slots, close, or fine adjustment of the angle or inclination of the tool slide bases can be obtained by pivoting the base to a block or bed, and the latter being bolted to the platen, or to the removable table, if employed. In such a case suitable clamping or binding means would be employed to hold the pivoted base in its adjusted position.

A brief summary of the operation of the machine shown may be of advantage.

With the machine stopped and with the platen, and the tool slides in their positions most remote from the chuck, a piece of work is placed in the chuck and then the machine started. The feed shaft being at this time connected with the constant high speed pulley, the cam drum is revolved at a speed to rapidly advance the tools to the work, in accordance with old and common practice, and then the cam drum is run at the proper cutting speed by automatically connecting the feed shaft with the work spindle, which may be before the limit of forward movement of the platen is reached so that cutting can be done through the remainder of the forward movement of the platen, and in advance of, or concurrently with feeding motion of the tool slides by their own feed devices. In the respect just mentioned there is an advantage over a machine having a separate and distinct mechanism merely for moving the platen up to the point where the tool slide feed is to be taken up by the tool slide feed devices.

An important advantage of the machine in that the platen is moved by a cam drum which makes one revolution for one cycle of the machine, is that any desired movement may be given the platen by altering the cam shapes and the platen may be fed either at a high or at a low rate of speed merely by varying the speed of rotation of the cam drum, which can be done automatically, or by changing the angle of the feed cam. It is possible to do such work as facing the inside of a recess by feeding the platen with the tool slide stationary until the tool cuts to the desired depth, and then moving the tool slide laterally. And by moving the platen and tool slides, in any combination, simultaneously, and in intersecting directions, contours may be turned, which, where the platen has no mechanism for imparting feed motion for cutting, can only be turned by using a compound tool slide and a former.

The scope of the protection sought for this invention is not to be restricted to the particular construction shown and described, but it extends to and includes all that is embraced in the following claims which are:

I claim:

1. A machine comprising a work-holder, a tool support, means for moving them relative to one another, one or more tool-holders, tool-holder feed means, acting independently of the means for relatively moving said support and work-holder, and means for securing the tool-holder or holders in various places on the support comprising a replaceable table on which the holder or holders are mounted.

2. A machine comprising a work-holder, a tool support, means for moving them relative to one another, tool-holders, tool-holder feed means, acting independently of the means for relatively moving said support and work-holder, means for securing the tool-holder or holders in various places on the support comprising a replaceable table on which the holders are mounted, a common drive shaft and independent connections from the latter to the feed means for the several holders.

3. A machine comprising a work-holder, a tool support, means for moving them relative to one another, one or more tool-holders, tool-holder feed means, acting independently of the means for relatively moving said support and work-holder, and means for securing the tool-holder or holders in various places on the support, said means for moving slide and work-holder relative to one another comprising a cam drum and a drum engaging roll adjustable to different positions on the part to which it is connected, and in the direction of movement of such part.

4. A machine comprising a work-holder, a tool support, means for moving them relative to one another, one or more tool-holders, tool-holder feed means, acting independently of the means for relatively moving said support and work-holder, means for securing the tool-holder or holders in various places on the support, a feed shaft, and driving connections from the feed shaft to the tool-holder feed means and to the means for causing relative movement of tool support and work-holder, said several driving connections being adapted for simultaneous action.

5. A machine comprising a work-holder, a tool support, means for moving them relative to one another, one or more tool-holders, tool-holder feed means, acting independently of the means for relatively moving said support and work-holder, and means for securing the tool-holder or holders in various places on the support, said tool-holder feed means comprising a reversible screw, reversely operable gearing to actuate said screw, and automatic means to control said reversely operable gearing.

6. A machine comprising a work-holder, a tool support, means for moving them relative to one another, tool-holders, tool-holder feed means, acting independently of the means for relatively moving said support and work-holder, means for securing the tool-holder or holders in various places on the support, and straight line drive shaft connections with the tool-holder feeds in whatever position the tool-holders are fixed.

7. A means to synchronize two rotary shafts, having in combination two such shafts, means for transmitting rotation from one to the other comprising a clutch with opposed coacting rotary relatively movable engageable members, means for unclutching said members, always in the same angular relation, and a gear driven by one of said shafts operatively connected with said means for unclutching said members and effecting unclutching movement.

8. The combination of a clutch mechanism for use with positively connectible transmission members, a rotatable shiftable clutching member, mechanism for shifting such member, and means for actuating such mechanism that includes one of such transmission members, whereby clutching engagement takes place with the clutched parts always in the same relative position.

9. The combination of a clutch mechanism for use with positively connectible members for alternate clutch engagement, a rotatable shiftable clutching member that produces such alternate engagement, mechanism for shifting such member, and means for actuating such mechanism including one of said alternately engageable members whereby the clutch engagement of the clutch member and said members always takes place with them in the same relative positions.

10. The combination of a clutch mechanism for use with positively connectible members for alternate clutch engagement, a rotatable shiftable clutching member that produces such alternate engagement, mechanism for shifting such member, and means for actuating such mechanism including one of said alternately engageable members whereby the clutch engagement of the clutch member and said members always takes place with them in the same relative positions, and said clutching member always occupies the same angular position at neutral.

11. The combination of a to and fro moving tool-holder, and means for moving the same, comprising a cam, two trains of oppositely acting gears adapted alternately to rotate said cam, a rotatable shiftable clutching member adapted to be alternately operatively connected with such trains of gears, and a clutch shifting device geared to and receiving motion from one of said trains of gears.

12. A machine comprising a work-revolving spindle, a tool support, means for moving the tool support towards and from the spindle, a plurality of tool-holders, tool-holder feed means acting independently of the means for moving said support, means for securing the tool-holders in various places on the support, a feed shaft, a driving connection between the feed shaft and the tool-holder and between the feed shaft and the tool-holder feed means, automatic means to vary the spindle speed, and means operatively tying together the spindle and the feed shaft.

13. A machine comprising a work-revolving spindle, a tool support, means for moving the tool support towards and from the spindle, a plurality of tool-holders, tool-holder feed means acting independently of the means for moving said support, means for securing the tool-holders in various places on the support, a feed shaft, a driving connection between the feed shaft and the tool-holder and between the feed shaft and the tool-holder feed means, automatic means to vary the spindle speed, means operatively tying together the spindle and the feed shaft, and means for driving the feed shaft at a constant speed independently of the spindle.

14. The combination of a feed shaft, a tool carrier movable to and fro, a drum for actuating said carrier, a feed shaft geared to said drum, the gearing synchronizing in rotation of said shaft, and drum, a second shaft whose motions are synchronized with the drum and a gear connection between the feed shaft and the second shaft which includes a clutch and clutch shifting means to operatively connect and disconnect the cooperating rotary parts in the same angular relation.

In testimony whereof I hereunto affix my signature.

MYRON S. CURTIS.